United States Patent
Otsuki et al.

(10) Patent No.: US 9,564,641 B2
(45) Date of Patent: Feb. 7, 2017

(54) ACTIVE MATERIAL, ELECTRODE, LITHIUM ION SECONDARY BATTERY, AND METHOD FOR MANUFACTURING ACTIVE MATERIAL

(75) Inventors: Keitaro Otsuki, Tokyo (JP); Atsushi Sano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 166 days.

(21) Appl. No.: 14/005,385

(22) PCT Filed: Mar. 30, 2012

(86) PCT No.: PCT/JP2012/058506
§ 371 (c)(1),
(2), (4) Date: Sep. 16, 2013

(87) PCT Pub. No.: WO2012/133729
PCT Pub. Date: Oct. 4, 2012

(65) Prior Publication Data
US 2014/0001413 A1 Jan. 2, 2014

(30) Foreign Application Priority Data
Mar. 31, 2011 (JP) .................................. 2011-080654

(51) Int. Cl.
*H01M 4/88* (2006.01)
*H01M 4/66* (2006.01)
*H01M 4/133* (2010.01)
*H01M 4/136* (2010.01)
*H01M 4/36* (2006.01)
(Continued)

(52) U.S. Cl.
CPC ............. *H01M 4/663* (2013.01); *H01M 4/133* (2013.01); *H01M 4/136* (2013.01); *H01M 4/364* (2013.01);
(Continued)

(58) Field of Classification Search
CPC ...... H01M 4/131; H01M 4/366; H01M 4/587; H01M 4/625; H01M 4/5825; H01M 4/13; C01B 25/45; C01B 25/375
(Continued)

(56) References Cited

U.S. PATENT DOCUMENTS

2004/0016632 A1* 1/2004 Barker ....................... 204/157.4
2008/0318133 A1* 12/2008 Matsuyama ............ H01M 4/13
429/300
(Continued)

FOREIGN PATENT DOCUMENTS

JP  A-2003-68304    3/2003
JP  A-2004-303527  10/2004

OTHER PUBLICATIONS

Lii et al., "Hyrdrothermal Synthesis, Structure, and Magnetic Properties of a New Polymorph of Lithium Vanadyl(IV) Orthophosphate: β-LiVOPO$_4$," *Journal of Solid State Chemistry*, 1991, vol. 95, pp. 352-359.
(Continued)

*Primary Examiner* — Khanh Tuan Nguyen
(74) *Attorney, Agent, or Firm* — Oliff PLC

(57) ABSTRACT

An active material that can achieve sufficient discharge capacity at high discharging rate, an electrode including the active material, and a lithium ion secondary battery including the electrode, and a method for manufacturing the active material are provided. The active material includes a LiVOPO$_4$ powder, a first carbon powder, and a second carbon powder. A relational expression of 0.05≤A1/A2≤0.5 is satisfied, where A1 represents the ratio of the G band peak height observed around 1580 cm$^{-1}$ in Raman spectrum of the first carbon powder to the 2D band peak height observed around 2700 cm$^{-1}$ in the Raman spectrum of the first carbon powder, and A2 represents the ratio of the G band peak height observed around 1580 cm$^{-1}$ in Raman spectrum of
(Continued)

the second carbon powder to the 2D band peak height observed around 2700 cm$^{-1}$ in the Raman spectrum of the second carbon powder.

18 Claims, 3 Drawing Sheets

(51) Int. Cl.
　　　*H01M 4/58*　　　(2010.01)
　　　*H01M 4/587*　　　(2010.01)
　　　*H01M 10/0525*　　　(2010.01)

(52) U.S. Cl.
　　　CPC ........... *H01M 4/587* (2013.01); *H01M 4/5825* (2013.01); *H01M 10/0525* (2013.01); *Y02E 60/122* (2013.01); *Y02P 70/54* (2015.11)

(58) Field of Classification Search
　　　USPC ..... 252/182.1, 507; 402/157.4; 429/221, 22, 429/300
　　　See application file for complete search history.

(56) References Cited

U.S. PATENT DOCUMENTS

| | | | |
|---|---|---|---|
| 2009/0263718 A1* | 10/2009 | Higashizaki et al. | ........ 429/221 |
| 2011/0012067 A1* | 1/2011 | Kay | ..................... C01B 25/375 |
| | | | 252/507 |

OTHER PUBLICATIONS

Dupré et al., "Positive Electrode Materials for Lithium Batteries Based on VOPO$_4$," *Solid State Ionics*, 2001, vol. 140, pp. 209-221.

Dupré et al., "Electrochemical Performance of Different Li-VOPO$_4$Systems," *Journal of Power Sources 97-98*, 2001, pp. 532-534.

Barker et al., "Electrochemical Properties of Beta-LiVOPO$_4$ Prepared by Carbothermal Reduction," *Journal of the Electrochemical Society*, 2004, vol. 151, No. 6, pp. A796-A800.

* cited by examiner

ACTIVE MATERIAL, ELECTRODE, LITHIUM ION SECONDARY BATTERY, AND METHOD FOR MANUFACTURING ACTIVE MATERIAL

TECHNICAL FIELD

The present invention relates to an active material, an electrode, a lithium ion secondary battery, and a method for manufacturing an active material.

BACKGROUND ART

Among phosphate-based positive electrode materials, $LiVOPO_4$ has been known as a compound that can achieve a charging/discharging voltage as high as 4 V. However, a lithium ion secondary battery with $LiVOPO_4$ has not yet achieved sufficient reversible capacity or rate characteristic. The above positive electrode material is disclosed in, for example, Patent Documents 1 and 2 and Non-Patent Documents 1 to 4 below. It is known that lithium ions can reversibly intercalate into and deintercalated from the crystal represented by the structural formula $LiVOPO_4$.

CITATION LIST

Patent Documents

Patent Document 1: JP-A-2004-303527
Patent Document 2: JP-A-2003-68304

Non-Patent Documents

Non-Patent Document 1: J. Solid State Chem., 95, 352 (1991)
Non-Patent Document 2: N. Dupre et al., Solid State Ionics, 140 pp. 209-221 (2001)
Non-Patent Document 3: N. Dupre et al., J. Power Sources, 97-98, pp. 532-534 (2001)
Non-Patent Document 4: J. Baker et al., J. Electrochem. Soc., 151 A796 (2004)

DISCLOSURE OF THE INVENTION

Problems to be Solved by the Invention

However, the discharge capacity of $LiVOPO_4$ powder obtained by a conventional method at high discharging rate is insufficient.

In view of this, an object of the present invention is to provide an active material that can achieve sufficient discharge capacity at high discharging rate, an electrode including the active material, a lithium secondary battery including the electrode, and a method for manufacturing the active material.

Solutions to the Problems

An active material according to the present invention includes a $LiVOPO_4$ powder, a first carbon powder, and a second carbon powder, wherein a relational expression of $0.05 \leq A1/A2 \leq 0.5$ is satisfied where A1 represents the ratio of G band peak height observed around 1580 $cm^{-1}$ in Raman spectrum of the first carbon powder to 2D band peak height observed around 2700 $cm^{-1}$ in the Raman spectrum of the first carbon powder, and A2 represents the ratio of G band peak height observed around 1580 $cm^{-1}$ in Raman spectrum of the second carbon powder to 2D band peak height observed around 2700 $cm^{-1}$ in the Raman spectrum of the second carbon powder. Further, in this active material, a relational expression of $0.1 \leq A1/A2 \leq 0.2$ is satisfied.

A method for manufacturing an active material according to the present invention includes a step of mixing a $LiVOPO_4$ powder, a first carbon powder, and a second carbon powder, wherein a relational expression of $0.05 \leq A1/A2 \leq 0.5$ is satisfied where A1 represents the ratio of G band peak height observed around 1580 $cm^{-1}$ in Raman spectrum of the first carbon powder to 2D band peak height observed around 2700 $cm^{-1}$ in the Raman spectrum of the first carbon powder, and A2 represents the ratio of G band peak height observed around 1580 $cm^{-1}$ in Raman spectrum of the second carbon powder to 2D band peak height observed around 2700 $cm^{-1}$ in the Raman spectrum of the second carbon powder.

Here, a relational expression of $0.02 \leq M1 \leq 0.98$ is preferably satisfied in which M1 represents the ratio of the weight of the first carbon powder to the total weight of the first carbon powder and the second carbon powder.

Moreover, a relational expression of $0.03 \leq M2 \leq 0.2$ is preferably satisfied in which M2 represents the ratio of the weight of the first carbon powder and the second carbon powder to the total weight of the $LiVOPO_4$ powder, the first carbon powder, and the second carbon powder.

The $LiVOPO_4$ powder is preferably obtained by hydrothermal synthesis.

The mixing is preferably performed by a planetary ball mill.

Effects of the Invention

According to the present invention, an active material that can achieve sufficient discharge capacity at high discharging rate, an electrode including the active material, a lithium secondary battery including the electrode, and a method for manufacturing the active material can be provided.

DESCRIPTION OF PREFERRED EMBODIMENTS

Figure 1:
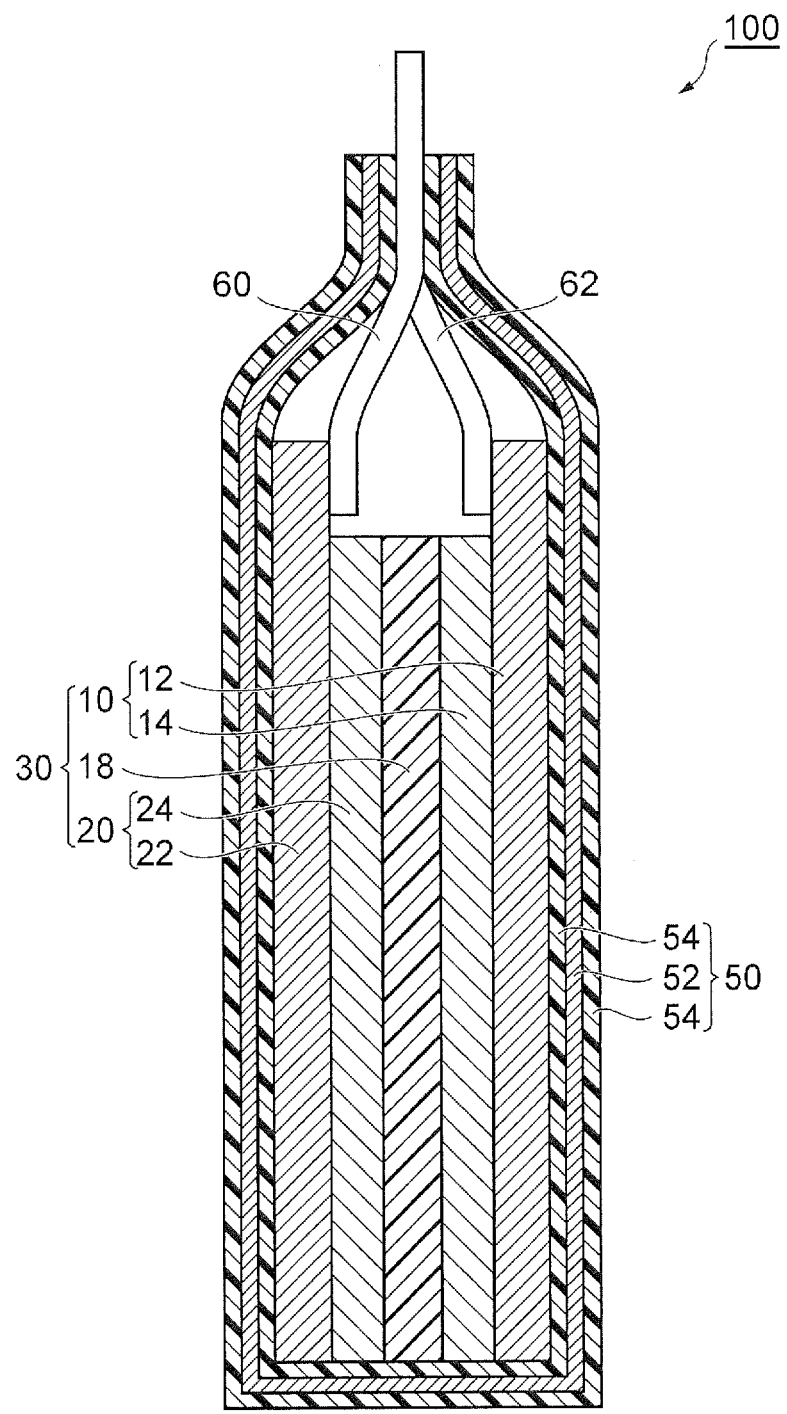
FIG. 1 is a schematic sectional view of a lithium ion secondary battery according to an embodiment.

Hereinafter, a preferred embodiment of the present invention is described in detail with reference to the drawings. In the description made below, the same or the corresponding parts are denoted by the same reference symbol, and the redundant description is not made. Further, the dimension ratio of the drawing is not limited to the ratio depicted in the drawing.

<Active Material>

First, an active material according to this embodiment is described. This active material is a mixture including a $LiVOPO_4$ powder, a first carbon powder, and a second carbon powder.

The $LiVOPO_4$ powder is not particularly limited as long as the powder has a $LiVOPO_4$ structure, but is preferably the powder obtained by hydrothermal synthesis. The crystal structure of the powder is not particular limited; for example, α-type, β-type, their mixture type, an amorphous type, or the like can be employed. In general, the LiVOPO$_4$ with the β-type crystal structure has a peak at 2θ=27.0 degrees and the LiVOPO$_4$ with the α-type crystal structure has a peak at 2θ=27.2 degrees. In addition to LiVOPO$_4$, the LiVOPO$_4$ powder may contain a small amount of unreacted raw material compositions or the like.

The mean diameter of the LiVOPO$_4$ powder is not limited in particular; however, a mean diameter of 50 nm to 5 μm is preferable. The mean diameter is obtained from the mean value of 100 of the maximum distances in a predetermined A direction in a SEM photograph, i.e., the distances between parallel tangent lines intersecting with the A direction (i.e., Feret's diameter).

The first carbon powder and the second carbon powder are different from each other in the ratio A of the G band peak height observed around 1580 cm$^{-1}$ in the Raman spectrum to the 2D band peak height observed around 2700 cm$^{-1}$ in the Raman spectrum.

Specifically, a relational expression of 0.05≤A1/A2≤0.5, preferably 0.1 A1/A2≤0.2, is satisfied where: A1 represents the ratio of the G band peak height observed around 1580 cm$^{-1}$ in the Raman spectrum of the first carbon powder to the 2D band peak height observed around 2700 cm$^{-1}$ in the Raman spectrum of the first carbon powder; and A2 represents the ratio of the G band peak height observed around 1580 cm$^{-1}$ in the Raman spectrum of the second carbon powder to the 2D band peak height observed around 2700 cm$^{-1}$ in the Raman spectrum of the second carbon powder.

For example, the results of measuring the ratio A by a method of a later described embodiment indicate that the ratio A of "DENKA BLACK FX-35" manufactured by DENKI KAGAKU KOGYO KABUSHIKI KAISHA is 2.00, the ratio A of "CARBON BLACK DAB" manufactured by DENKI KAGAKU KOGYO KABUSHIKI KAISHA is 2.19, the ratio A of "Synthetic Graphite KS-6" manufactured by TIMCAL is 1.60, the ratio A of "Super P" manufactured by MMM Carbon is 11.19, and the ratio A of "Oil Furnace Black #3400B" manufactured by Mitsubishi Chemical is 13.89, and the ratio A of "Ketjen Black" manufactured by Ketjen Black International is 14.41. Therefore, for example, the combination of any of FX-35, DAB, KS-6, and Super P and any of 3400B and EC600JD can satisfy the above relational expression.

The particle diameter of the carbon powder is not particularly limited; however, the size that allows the powder to function as a conductive auxiliary agent is preferable. Specifically, the central mean diameter is preferably 20 to 150 nm.

The mixing ratio between the first carbon powder and the second carbon powder is not particularly limited. It is preferable that, however, when the ratio A1 of the first carbon powder is smaller than the ratio A2 of the second carbon powder (A1<A2), the ratio M1 of the weight of the first carbon powder to the total weight of the first carbon powder and the second carbon powder satisfies 0.02≤M1≤0.98, more preferably 0.1≤M1≤0.95, and particularly preferably 0.5≤M≤0.8.

The mixture ratio of the first carbon powder and the second carbon powder to the LiVOPO$_4$ powder is not particularly limited. It is preferable that, however, the ratio M2 of the weight of the first carbon powder and the second carbon powder to the total weight of the first carbon powder, the second carbon powder, and the LiVOPO$_4$ powder satisfies 0.03≤M2≤0.2, more preferably 0.05≤M2≤0.15, and particularly preferably 0.06≤M2≤0.12.

In particular, the LiVOPO$_4$ powder and the first carbon powder and the second carbon powder are preferably mixed by a planetary ball mill.

The active material of this embodiment has high discharge capacity at high discharging rate. The reason why this result is led is not clear; it is assumed that the first carbon powder and the second carbon powder constitute a conductive network to cover the active material effectively.

<Method for Manufacturing Active Material>

An example of a method for manufacturing the active material of the present embodiment is described. The method for manufacturing the active material of the present embodiment includes a step of obtaining a LiVOPO$_4$ powder and a step of mixing the formed LiVOPO$_4$ powder and a carbon powder.

[Step of Obtaining LiVOPO$_4$ Powder]

Although a method of obtaining the LiVOPO$_4$ powder is not particularly limited, a hydrothermal synthesis method is preferable. The hydrothermal synthesis method is described below. Alternatively, another method such as a solid-phase method is applicable.

(Hydrothermal Synthesis Method)

First, a mixture including a lithium source, a pentavalent vanadium source, a phosphate source, water, and a reducing agent is heated in an airtight container. By the use of the airtight container, the container comes to have a pressured state inside along with the heating.

(Mixture)

Examples of the lithium source include a lithium compound such as LiNO$_3$, Li$_2$CO$_3$, LiOH, LiCl, Li$_2$SO$_4$, and CH$_3$COOLi; above all, LiNO$_3$ and Li$_2$CO$_3$ are preferable. Examples of the pentavalent vanadium source include a vanadium compound such as V$_2$O$_5$ and NH$_4$VO$_3$. Examples of the phosphate source include a compound containing PO$_4$, such as H$_3$PO$_4$, NH$_4$H$_2$PO$_4$, (NH$_4$)$_2$HPO$_4$, and Li$_3$PO$_4$; above all, H$_3$PO$_4$ and (NH$_4$)$_2$HPO$_4$ are preferable.

Although the concentration of the lithium source is not particularly limited, the ratio of the number of moles of the lithium atoms to the number of moles of the pentavalent vanadium atoms is preferably 0.95 to 1.2. Further, although the concentration of the phosphate source is not limited, the ratio of the number of moles of the phosphorus atoms to the number of moles of the pentavalent vanadium atoms is preferably 0.95 to 1.2. If the mixing ratio of at least one of the lithium atom and the phosphorous atom is less than 0.95, the discharge capacity of the obtained active material tends to decrease and the rate characteristic tends to deteriorate. If the mixing ratio of at least one of the lithium atom and the phosphorous atom is more than 1.2, the discharge capacity of the obtained active material tends to decrease.

The reducing agent is not particularly limited; for example, organic acids such as citric acid, ascorbic acid, and tartaric acid, hydrazine, and hydrogen peroxide are given. The amount of the reducing agent to be mixed is not particularly limited; it is preferable that, however, the reducing agent is preferably contained by 0.1 to 1 mol/L relative to the total amount of the mixture. The proportion of the number of moles of the reducing agent is preferably 10 to 100 mol % relative to the number of moles of the pentavalent vanadium atoms.

The amount of water in the mixture is not particularly limited as long as the hydrothermal synthesis is possible. It is preferable, however, that the proportion of the materials other than water in the mixture is 35 mass % or less.

The order of inputting the raw materials for preparing the mixture is not particularly limited. For example, the raw materials for the mixture may be mixed all at once, or the pentavalent vanadium compound may be added to the mixture of water and the compound containing $PO_4$ first, and then the reducing agent and the lithium compound may be added thereto in this order or at the same time. Further, the mixture is preferably mixed sufficiently to disperse the added components sufficiently. It is preferable that at least a part of the lithium compound, the pentavalent vanadium compound, and the compound containing $PO_4$ is not dissolved in water and the mixture is a suspension.

In the hydrothermal synthesis step, first, the above mixture (lithium compound, pentavalent vanadium compound, compound containing $PO_4$, water, reducing agent, etc.) is input to a reaction container (for example, autoclave) having a function of achieving high-temperature and pressured state inside by heating the mixture containing moisture in the airtight container. The mixture may be adjusted in the reaction container.

Next, the reaction container is sealed and heated. The heating temperature is not particularly limited, but is preferably set to 130 to 250° C., and more preferably 150 to 200° C. from the viewpoint of improving the discharging rate characteristic of the active material to be obtained.

In this case, the pressure inside the reaction container changes along with the temperature; however, a pressure of 0.1 to 30 MPa is preferable. It is considered that with this temperature-rising step, the hydrothermal reaction of the mixture proceeds and the active material as above is formed. The time for keeping the predetermined temperature is not particularly limited; however, 1 to 30 hours is preferable. Through such a temperature-rising step, the hydrothermal reaction of the mixture proceeds, thereby forming a $LiVOPO_4$ powder. The hydrothermal synthesis step may be performed continuously instead of the batch system. The high-temperature high-pressure state as above is preferably maintained for a predetermined period. The period for which the state is maintained is not particularly limited; however, 1 to 30 hours is preferable. The hydrothermal synthesis step may be performed continuously instead of the batch system.

After that, the reactant is cooled. The cooling speed is not particularly limited; after the heating is stopped, the reactant may be cooled down to the normal temperature. The resulting $LiVOPO_4$ powder is generally deposited as a solid in a solution after the hydrothermal synthesis. The solution after the hydrothermal synthesis is, for example, filtered to allow the solid to be collected, the collected solid is washed with water, acetone, or the like, and then the solid is dried; thus, the $LiVOPO_4$ powder can be efficiently obtained.

The $LiVOPO_4$ powder obtained by the hydrothermal synthesis may be annealed. This may promote the crystallization. For example, the annealing can be performed at 400 to 650° C. As the heating temperature is increased, the particle diameter (primary particle diameter) tends to increase because the grain growth of the active material is promoted. Meanwhile, if the heating temperature is too low, the crystallization tends to be suppressed. The annealing time is not particularly limited; however, 3 to 8 hours is applicable.

The atmosphere for the annealing step is not particularly limited; however, the atmosphere is preferably the air atmosphere for facilitating the removal of the reducing agent. Alternatively, the annealing step may be performed in an inert atmosphere such as argon gas or nitrogen gas.

The crystal structure of the $LiVOPO_4$ powder can be controlled based on the order of mixing the raw materials, the kind of the reducing agent, the temperature of the hydrothermal synthesis, the presence or absence of the annealing step, or the conditions of the annealing, for example.

Subsequently, the obtained $LiVOPO_4$ powder is mixed with the aforementioned first carbon powder and second carbon powder. The method of mixing is not particularly limited; it is preferable that, however, they are mixed by a planetary ball mill. The mixing using the planetary ball mill provides advantageous effects that: the pulverizing is performed effectively and the dispersibility is high, for example. The mixing time in the planetary ball mill is not particularly limited but may be 1 to 30 minutes, and is preferably 3 to 10 minutes. The mixing may be performed by using other method than the planetary ball mill.

<Electrode and Lithium Ion Secondary Battery Including the Electrode>

Next, an electrode including the active material of this embodiment and a lithium ion secondary battery including the electrode are described. The electrode of this embodiment includes a current collector and an active material layer including the active material and provided on the current collector. FIG. 1 is a schematic sectional view of a lithium ion secondary battery 100 of this embodiment including the electrode.

The lithium ion secondary battery 100 mainly includes a multilayer body 30, a case 50 for housing the multilayer body 30 in a sealed state, and a pair of leads 60 and 62 connected to the multilayer body 30.

The multilayer body 30 is formed by disposing a pair of a positive electrode 10 and a negative electrode 20 so as to face each other with a separator 18 interposed therebetween. The positive electrode 10 is formed by providing a positive electrode active material layer 14 on a plate-like (film-like) positive electrode current collector 12. The negative electrode 20 is formed by providing a negative electrode active material layer 24 on a negative electrode current collector 22. The positive electrode active material layer 14 and the negative electrode active material layer 24 are in contact with both sides of the separator 18. Ends of the positive electrode current collector 12 and the negative electrode current collector 22 are connected to the leads 60 and 62, respectively. Ends of the leads 60 and 62 extend out of the case 50.

The positive electrode 10 and the negative electrode 20 are hereinafter collectively referred to as electrodes 10 and 20, the positive electrode current collector 12 and the negative electrode current collector 22 are hereinafter collectively referred to as current collectors 12 and 22, and the positive electrode active material layer 14 and the negative electrode active material layer 24 are hereinafter collectively referred to as active material layers 14 and 24.

First, the electrodes 10 and 20 are described in detail.

(Positive Electrode 10)

The positive electrode current collector 12 may employ any conductive plate material; for example, a metal thin plate such as an aluminum, copper, or nickel foil can be used. The positive electrode active material layer 14 contains the active material of this embodiment, a binder, and a necessary amount of conductive material.

The binder binds the active materials to each other and binds the active material and the positive electrode current collector 12.

As the material for the binder, any material that allows the binding as above is applicable; for example, fluorine resin such as polyvinylidene fluoride (PVDF), polytetrafluoroethylene (PTFE), tetrafluoroethylene-hexafluoropropylene copolymer (FEP), tetrafluoroethylene-perfluoroalkylvinylether copolymer (PFA), ethylene-tetrafluoroethylene copolymer (ETFE), polychlorotrifluoroethylene (PCTFE), ethylene-chlorotrifluoroethylene copolymer (ECTFE), or polyvinyl fluoride (PVF) is given.

In addition to the above, vinylidene fluoride-based fluorine rubber as follows is also applicable as the binder: vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethylvinylether-tetrafluoroethylene-based fluorine rubber (VDF-PFMVE-TFE-based fluorine rubber), or vinylidene fluoride-chlorotrifluoroethylene-based fluorine rubber (VDF-CTFE-based fluorine rubber).

Furthermore, in addition to the above, the following is applicable as the binder: polyethylene, polypropylene, polyethylene terephthalate, aromatic polyamide, cellulose, styrene butadiene rubber, isoprene rubber, butadiene rubber, ethylene propylene rubber, or the like. Further, a thermoplastic elastomer polymer such as a styrene-butadiene-styrene-block copolymer, its hydrogen-added product, a styrene-ethylene-butadiene-styrene copolymer, a styrene-isoprene-styrene-block copolymer, or its hydrogen-added product is also applicable. Alternatively, syndiotactic 1,2-polybutadiene, ethylene-vinyl acetate copolymer, propylene α-olefin (carbon number of 2 to 12) may be used.

Further alternatively, electronically conductive polymer or ion-conductive polymer may be used as the binder. As the electronically conductive polymer, for example, polyacetylene or the like is given. In this case, the binder exhibits the function of the conductive member; thus, the conductive member is not necessary.

As the ion-conductive polymer, for example, lithium ions or the like can be used. For example, a composite of a monomer of a polymer compound, and lithium salt or an alkali metal salt mainly containing lithium is given. Examples of the polymer compound include a polyether-based polymer compound such as polyethylene oxide or polypropylene oxide, a cross-linking polymer of a polyether compound, polyepichlorohydrin, polyphosphazene, polysiloxane, polyvinyl pyrrolidone, polyvinylidene carbonate, and polyacrylonitrile. Examples of the lithium salt include $LiClO_4$, $LiBF_4$, $LiPF_6$, $LiAsF_6$, $LiCl$, $LiBr$, $Li(CF_3SO_2)_2N$, and $LiN(C_2F_5SO_2)_2$. A polymerization initializer used for forming the composite may be, for example, thermal polymerization initiator or a photopolymerization initializer which is applicable to the monomer.

The content of the binder in the positive electrode active material layer 14 is preferably 0.5 to 6 mass % based on the mass of the active material layer. When the content of the binder is less than 0.5 mass %, the amount of binder is too small to form the firm active material layer. Meanwhile, when the content of the binder is more than 6 mass %, the amount of binder that does not contribute to the electric capacitance is large, in which case the sufficient volume energy may be unable to obtain. In this case, especially when the electronic conductivity of the binder is low, the electric resistance of the active material layer increases, so that the sufficient electric capacitance cannot be obtained.

As the conductive material, for example, carbon blacks, a carbon material, micropowder of metal such as copper, nickel, stainless steel, or iron, a mixture of the carbon material and the micropowder of metal, and a conductive oxide such as ITO are given.

(Negative Electrode 20)

The negative electrode current collector 22 may employ any conductive plate material; for example, a metal thin plate of an aluminum, copper, or nickel foil may be used. The negative electrode active material is not particularly limited; a known negative electrode active material for a battery can be used. As the negative electrode active material, for example, a carbon material such as graphite, hard carbon, soft carbon, low temperature or heat-treated carbon, capable of absorbing or releasing (intercalating/deintercalating, or doping/dedoping) lithium ions, metal capable of forming a composition with lithium, such as Al, Si, or Sn, an amorphous compound mainly containing an oxide, such as $SiO_2$ or $SnO_2$, and particles including lithium titanate ($Li_4Ti_5O_{12}$) and the like are given. The binder and the conductive material may be similar to those of the positive electrode.

Next, a method for manufacturing the electrodes 10 and 20 of this embodiment is described.

(Method for Manufacturing Electrodes 10 and 20)

The method for manufacturing the electrodes 10 and 20 of this embodiment includes a step of applying a coating as a raw material of the electrode active material layers 14 and 24 on a current collector (hereinafter may be referred to as "application step") and a step of removing the solvent in the coating applied onto the current collector (hereinafter may be referred to as "solvent removal step").

(Application Step)

The application step of applying the coating on the current collectors 12 and 22 is described. The coating includes the above active material, a binder, and a solvent. In addition to these, the coating may include a conductive material for increasing the conductivity of the active material, for example. As the solvent, for example, N-methyl-2-pyrrolidone, N,N-dimethylformamide, or the like can be used.

A method of mixing the components of the coating, such as the active material, the binder, the solvent, and the conductive material is not particularly limited; moreover, the order of mixing is not limited in particular. For example, first, the active material, the conductive material, and the binder are mixed, and to the mixture, N-methyl-2-pyrrolidone is further added and mixed, thereby preparing the coating.

The coating is applied to the current collectors 12 and 22. The application method is not particularly limited; a method generally employed for manufacturing electrodes, such as a slit die coating method and a doctor blade method can be used.

(Solvent Removal Step)

Subsequently, the solvent in the coating applied onto the current collectors 12 and 22 is removed. The method for removing the solvent is not particularly limited, and the current collectors 12 and 22 having the coating may be dried in the atmosphere of 80 to 150° C., for example.

Then, the electrodes having the active material layers 14 and 24 formed thereon may be pressed by a roll pressing device or the like as necessary, for example. The linear pressure of the roll press may be, for example, 10 to 50 kgf/cm.

Through the above steps, the electrode according to this embodiment can be manufactured.

Since the electrode of this embodiment includes the active material according to this embodiment as the positive electrode active material, the electrode with sufficient discharge capacity can be provided.

Here, the other components of the lithium ion secondary battery 100 including the electrode manufactured as above are described.

The positive electrode active material layer 14, the negative electrode active material layer 24, and the separator 18 contain an electrolyte inside. The electrolyte is not particularly limited; for example, an electrolytic solution (electrolytic aqueous solution or electrolytic solution including organic solvent) containing lithium salt can be used in this embodiment. However, since the electrolytic aqueous solution has low decomposing voltage electrochemically, the withstanding voltage at the charging time is restricted to be low; thus, the electrolytic solution using organic solvent (nonaqueous electrolytic solution) is preferable. As the electrolytic solution, the solution in which lithium salt is dissolved in a nonaqueous solvent (organic solvent) is preferably used. Examples of the lithium salt include $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB. Any of these salts may be used alone or two or more kinds thereof may be used in combination.

Examples of the organic solvent include propylene carbonate, ethylene carbonate, and diethyl carbonate. Any of these salts may be used alone or two or more kinds thereof may be mixed at an arbitrary ratio.

In this embodiment, other than the liquid electrolyte, a gel-like electrolyte obtained by adding a gelling agent is also applicable. Instead of the electrolytic solution, a solid electrolyte (solid polymer electrolyte or electrolyte including an ion-conductive inorganic material) may be contained.

The separator 18 is an electrically insulating porous body, and for example, a single-layer body or a multilayer body of a film including polyethylene, polypropylene, or polyolefin, an extended film of a mixture of the above resin, or nonwoven fabric including at least one component material selected from the group consisting of cellulose, polyester, and polypropylene is applicable.

Figure 2:
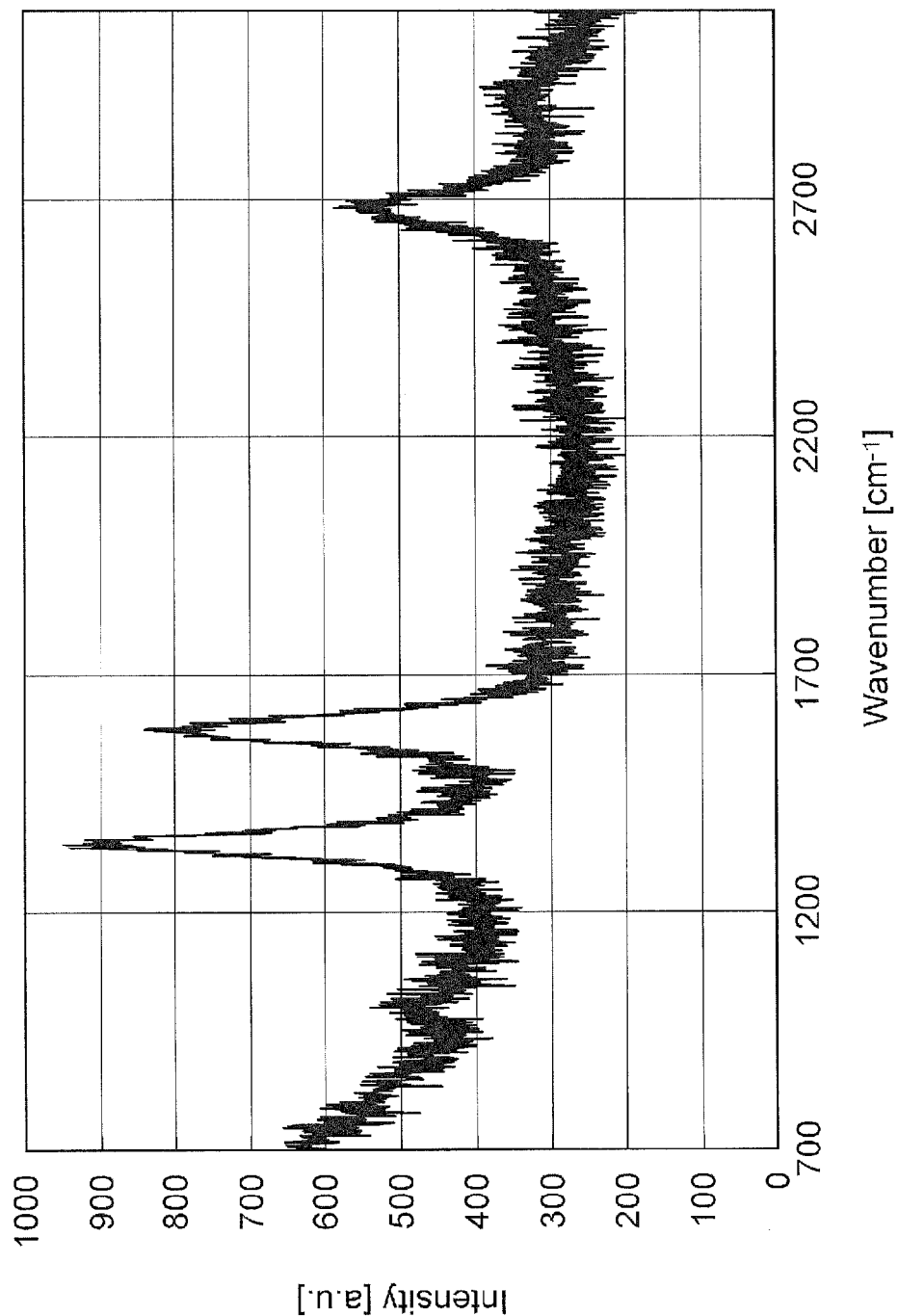
FIG. 2 is a chart representing the raw data of Raman spectrum of FX-35 (carbon powder).

The case 50 is to have the multilayer body 30 and the electrolytic solution inside in a sealed state. The case 50 is not particularly limited as long as the leakage of the electrolytic solution to the outside and the intrusion of moisture and the like from the outside to the inside of the electrochemical device 100 can be suppressed. For example, a metal laminated film obtained by coating a metal foil 52 with a polymer film 54 on both sides as depicted in FIG. 2 can be used as the case 50. For example, an aluminum foil can be used as the metal foil 52, and a film of polypropylene or the like can be used as the polymer film 54. For example, as the material of the external polymer film 54, polymer with a high melting point such as polyethylene terephthalate (PET) or polyamide is preferable. As the material of the internal polymer film 54, polyethylene (PE), polypropylene (PP), or the like is preferable.

The leads 60 and 62 are formed of a conductive material such as aluminum.

The leads 60 and 62 may be welded to the positive electrode current collector 12 and the negative electrode current collector 22 by a known method, respectively, and the leads 60 and 62 may be inserted into the case 50 together with the electrolytic solution in a manner that the separator 18 is interposed between the positive electrode active material layer 14 of the positive electrode 10 and the negative electrode active material layer 24 of the negative electrode 20, and then the port of the case 50 may be sealed.

Thus, the preferred embodiment of the active material of the present invention, the electrode including the active material, the lithium ion secondary battery including the electrode, and the method for manufacturing these is described; however, the present invention is not limited to the above embodiment.

For example, the electrode including the active material of the present invention can be used for other electrochemical element than the lithium ion secondary battery. Examples of the electrochemical element include a secondary battery other than the lithium ion secondary battery such as a metal lithium secondary battery (battery including the active material of the present invention for a cathode and including metal lithium for an anode) and an electrochemical capacitor such as a lithium capacitor. These electrochemical elements can be used for the purpose of a power source provided for a self-running micromachine, an IC card, or the like, on a printed board or for a dispersion power source disposed on a printed board.

EXAMPLES

The present invention is hereinafter described more specifically based on examples and comparative examples. However, the present invention is not limited to the following examples.

Example A1

Manufacture of α-Type $LiVOPO_4$ Powder Through Hydrothermal Synthesis

In a glass inner cylinder of an autoclave of 500 mL content, 18.37 g (0.10 mol) of $V_2O_5$ (purity of 99%, manufactured by Nacalai tesque) was gradually added to an aqueous solution including 200 g of distilled water (for HPLC, manufactured by Nacalai tesque) and 23.08 g (0.20 mol) of $H_3PO_4$ (purity of 85%, manufactured by Nacalai tesque). Then, the container is sealed and the solution was stirred for 16 hours at 95° C.

The pH of the solution after the solution was cooled to room temperature was 1. Next, the glass inner cylinder was opened and 8.48 g (0.20 mol) of $LiOH.H_2O$ (purity of 99%, manufactured by Nacalai tesque) and 7.13 g (0.04 mol) of L(+) ascorbic acid were gradually added to the solution. The pH was 4, and the color was dark green. Next, the container was sealed and the solution was stirred for 8 hours at 160° C. After that, the solution was stirred for 8 hours at 145° C.

After that, the solution was cooled to room temperature, and the content of the glass inner cylinder (blue, pH=4) was spread on a tray and distilled to dry in an oven at 90° C.; then, a dried substance was pulverized in a mortar to provide 47.29 g of powder with grayish light-blue color.

Out of the obtained sample, 3.00 g was put into an alumina crucible and the temperature thereof was increased from room temperature to 450° C. in 45 minutes in the air atmosphere, and the thermal treatment was performed for 4 hours at 450° C. Thus, 2.09 g of powder was obtained. As a result of the X-ray diffraction measurement of the obtained particles, the particles were confirmed to be mainly composed of $LiVOPO_4$ with the α-type crystal structure.

[Mixture of α-Type $LiVOPO_4$ Powder and Two Kinds of Carbon Powder]

"DENKA BLACK FX-35" of DENKI KAGAKU KOGYO KABUSHIKI KAISHA was used as the first carbon powder and "Ketjen black EC600JD" of Ketjen Black International was used as the second carbon powder. Here, the weight ratio was LiVOPO$_4$ powder:the first carbon powder:the second carbon powder=90:5:5. The mixing was performed for three minutes in a planetary ball mill with a rotation number of 550 rpm, thereby providing the active material.

[Measurement of Ratio A of Carbon Powder Ratio]
Equipment used: JOBIN YVON, LabRam 1B
Light source: Ar laser of 10 mW, wavelength 514.5 nm
Filter: D 0.6, aperture 1000 μm, slit 200 μm
Sampling: 15 s×2 times
Diffraction lattice: 1800 g/mm
Scanning range: 700 to 3100 cm$^{-1}$ The carbon powder was applied to a sticky copper foil tape and was pulverized with a spatula. As a result of scanning the carbon powder in the aforementioned scanning range, the D band peak appears around 1350 nm, the G band peak appears around 1580 nm, and the 2D band peak appears around 2700 nm. The background around the G band and the D band is eliminated by a straight-line method using 1000 cm$^{-1}$ as a start point and 1800 cm$^{-1}$ as an end point by taking the average of 9 movement points of the raw data, so that the peak height of the G band is obtained based on the maximum value of the peak. Moreover, the background around the 2D band is eliminated by a straight-line method using 2550 cm$^{-1}$ as a start point and 2850 cm$^{-1}$ as an end point by taking the average of 9 movement points of the raw data, so that the peak height of the 2D band is obtained based on the maximal value of the peak.

Figure 3:
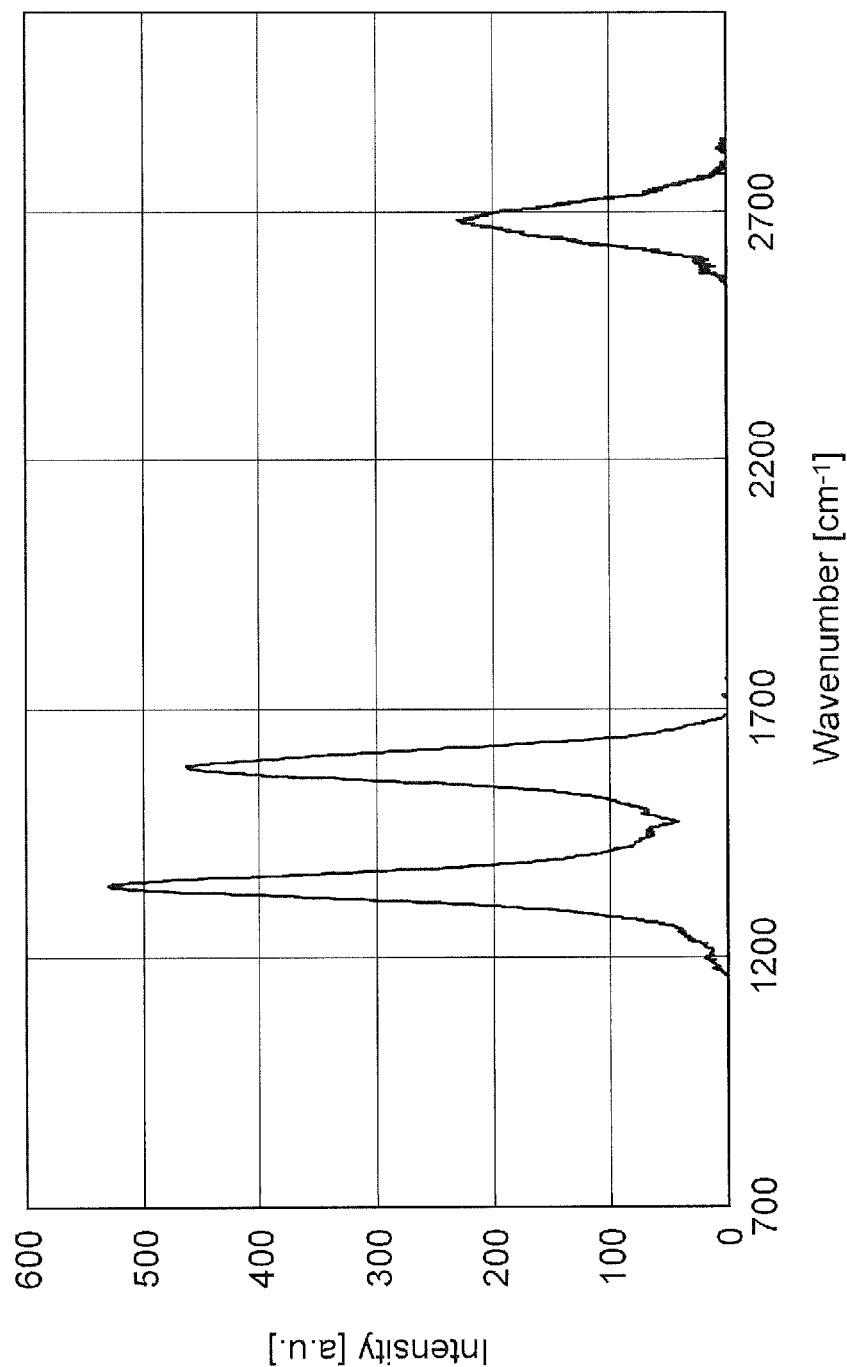
FIG. 3 is a chart in which the chart of FIG. 2 is moved and averaged to remove the background by a straight-line method.

The raw data of the Raman spectrum obtained from FX-35 are shown in FIG. 2, and the data after the movement average process and the removal of the background are shown in FIG. 3. The same sample was measured 5 times, and the average value of the ratio A was 2.00.

[Measurement of Discharge Capacity]
The obtained active material and polyvinylidene fluoride (PVDF) as a binder were mixed and dispersed in the solvent, N-methyl-2-pyrrolidone (NMP), thereby preparing slurry. Note that the slurry was adjusted so that the weight ratio between the active material and PVDF was 90:10. This slurry was applied onto the aluminum foil as the current collector, and dried and rolled, thereby providing the electrode (positive electrode) having the active material layer including the active material.

The obtained electrode and a Li foil as a counter electrode thereof were stacked with a separator including a polyethylene microporous film interposed therebetween, thereby providing a multilayer body (element). This multilayer body was put into an aluminum laminate package. Into this aluminum laminate package, 1 M of LiPF$_6$ solution as the electrolytic solution (solvent having the volume ratio of EC (ethylene carbonate):DEC (diethyl carbonate)=30:70) was injected and the package was sealed to vacuum, thereby manufacturing an evaluation cell.

Using each evaluation cell, the discharge capacity (unit: mAh/g) in the case where the discharging rate was 1 C (current value at which, when the constant-current discharging is performed, the discharging ends in one hour) at 25° C. in the voltage range of 4.3 to 2.8 V was measured.

Examples A2 to A8

These examples are similar to Example 1 except that the weight ratio of the LiVOPO$_4$ powder:the first carbon powder:the second carbon powder=90:6:4, 90:7:3, 90:8:2, 90:9.5:0.5, 90:4:6, 90:3:7, and 90:1:9.

Example A9

This example is similar to Example 2 except that "CARBON BLACK DAB" of DENKI KAGAKU KOGYO KABUSHIKI KAISHA is used as the first carbon powder. The ratio A of the first carbon powder was 2.19.

Example A10

This example is similar to Example 2 except that "Synthetic Graphite KS-6" of TIMCAL is used as the first carbon powder. The ratio A of the first carbon powder was 1.60.

Example A11

This example is similar to Example 2 except that "Oil Furnace Black #3400B" of Mitsubishi Chemical is used as the second carbon powder. The ratio A of the second carbon powder was 13.89.

Example A12

This example is similar to Example 2 except that Super P of MMM Carbon is used as the second carbon powder. The ratio A of the second carbon powder was 11.19.

Example A13

This example is similar to Example 2 except that "CARBON BLACK DAB" of DENKI KAGAKU KOGYO KABUSHIKI KAISHA is used as the first carbon powder and "Oil Furnace Black #3400B" of Mitsubishi Chemical is used as the second carbon powder.

Examples A14 to A17

These examples are similar to Example 2 except that the mixture time was changed to 5 minutes, 10 minutes, 30 minutes, 45 minutes, and 60 minutes.

Comparative Example A1

This example is similar to Example 9 except that the second carbon powder is not used and the weight ratio in the mixture is set to the LiVOPO$_4$ powder:the first carbon powder=90:10 and that the mixture time is changed to 60 minutes.

Comparative Example A2

This example is similar to Comparative Example 1 except that the mixture time is changed to 3 minutes.

Comparative Example A3

This example is similar to Example 2 except that Super P of MMM Carbon is used as the first carbon powder and "Ketjen black EC600JD" of Ketjen Black International is used as the second carbon powder.

Comparative Example A4

This example is similar to Example 2 except that "Synthetic Graphite KS-6" of TIMCAL is used as the first carbon powder and "Ketjen black EC600JD" of Ketjen Black International is used as the second carbon powder.

Example B1

Manufacture of β-Type LiVOPO$_4$ Powder by Hydrothermal Synthesis

In a glass inner cylinder of an autoclave of 500 mL content, 18.37 g (0.10 mol) of V$_2$O$_5$ (purity of 99%, manufactured by Nacalai tesque) was added to an aqueous solution including 200 g of distilled water (for HPLC, manufactured by Nacalai tesque) and 23.08 g (0.20 mol) of H$_3$PO$_4$ (purity of 85%, manufactured by Nacalai tesque). Then, the solution was stirred for 2.5 hours, thereby providing a yellow-orange suspension. After that, 2.55 g (0.05 mol) of hydrazine monohydrate (NH$_2$NH$_2$H$_2$O) was dropped therein while the solution was stirred; then, the color turned into dark green. Subsequently, the solution was stirred for one hour; then, the color turned into mustard color and the solution changed into fluid paste. Next, 8.48 g (0.20 mol) of LiOH.H$_2$O (purity of 99%, manufactured by Nacalai tesque) was gradually added in 10 minutes. The pH was in the range of 7 to 8. Then, the container was sealed and the solution was stirred for 16 hours at 160° C. After that, the solution was cooled to the room temperature and the content of the glass inner cylinder (light blue paste with a pH of 7) was spread on a tray and distilled and dried in an oven at 90° C. The dried substance was pulverized in a coffee mill, thereby providing 38.27 g of a light-blue powder.

Out of the obtained sample, 3.00 g was put into an alumina crucible and the temperature thereof was increased from room temperature to 600° C. in 45 minutes in the air atmosphere, and the thermal treatment was performed for 4 hours at 600° C. Thus, 2.567 g of powder was obtained. As a result of the X-ray diffraction measurement of the obtained particles, the particles were confirmed to be mainly composed of LiVOPO$_4$ with the β-type crystal structure. The example was similar to Example A1 except that the LiVOPO$_4$ with the β-type crystal structure was used.

Examples B2 to B17 and Comparative Examples B1 to B4

Examples B2 to B17 and Comparative Examples B1 to B4 are similar to Examples A2 to A17 and Comparative Examples A1 to A4 except that the LiVOPO$_4$ with the β-type crystal structure obtained in Example B1 was used. The conditions and results are shown in Table 1 and Table 2.

TABLE 1

|  | Mixture Time (min) of LiVOPO$_4$ | Carbon Powder 1 Upper: A1 Lower: Kind | Carbon Powder 2 Upper: A2 Lower: Kind | A1/A2 | Weight of Carbon Powder 1/(Weight of Carbon Powder 1 and Carbon Powder 2) | 1C Discharge Capacity [mAh/g] |
|---|---|---|---|---|---|---|
| Example A1 | 3 | 2.00 (FX-35) | 14.41 (EC600JD) | 0.14 | 0.5 | 110 |
| Example A2 | 3 | 2.00 (FX-35) | 14.41 (EC600JD) | 0.14 | 0.6 | 113 |
| Example A3 | 3 | 2.00 (FX-35) | 14.41 (EC600JD) | 0.14 | 0.7 | 111 |
| Example A4 | 3 | 2.00 (FX-35) | 14.41 (EC600JD) | 0.14 | 0.8 | 108 |
| Example A5 | 3 | 2.00 (FX-35) | 14.41 (EC600JD) | 0.14 | 0.95 | 89 |
| Example A6 | 3 | 2.00 (FX-35) | 14.41 (EC600JD) | 0.14 | 0.4 | 106 |
| Example A7 | 3 | 2.00 (FX-35) | 14.41 (EC600JD) | 0.14 | 0.3 | 102 |
| Example A8 | 3 | 2.00 (FX-35) | 14.41 (EC600JD) | 0.14 | 0.1 | 93 |
| Example A9 | 3 | 2.19 (DAB) | 14.41 (EC600JD) | 0.15 | 0.6 | 109 |
| Exampl A10 | 3 | 1.60 (KS-6) | 14.41 (EC600JD) | 0.11 | 0.6 | 98 |
| Example A11 | 3 | 2.00 (FX-35) | 13.89 (3400B) | 0.14 | 0.6 | 101 |
| Example A12 | 3 | 2.00 (FX-35) | 11.19 (SuperP) | 0.18 | 0.6 | 102 |
| Example A13 | 3 | 2.19 (DAB) | 13.89 (3400B) | 0.16 | 0.6 | 101 |
| Example A14 | 5 | 2.00 (FX-35) | 14.41 (EC600JD) | 0.14 | 0.6 | 109 |
| Example A15 | 10 | 2.00 (FX-35) | 14.41 (EC600JD) | 0.14 | 0.6 | 107 |
| Example A16 | 30 | 2.00 (FX-35) | 14.41 (EC600JD) | 0.14 | 0.6 | 100 |
| Example A17 | 45 | 2.00 (FX-35) | 14.41 (EC600JD) | 0.14 | 0.6 | 91 |
| Comparative Example A1 | 60 | 2.19 (DAB) | None | — | 1 | 80 |
| Comparative Example A2 | 3 | 2.19 (DAB) | None | — | 1 | 80 |
| Comparative Example A3 | 3 | 11.19 (SuperP) | 14.41 (EC600JD) | 0.78 | 0.6 | 88 |
| Comparative Example A4 | 3 | 1.60 (KS-6) | 2.19 (DAB) | 0.73 | 0.6 | 82 |

TABLE 2

| | Mixture Time (min) of LiVOPO$_4$ and Carbon | Carbon Powder 1 Upper: A1 Lower: Kind | Carbon Powder 2 Upper: A2 Lower: Kind | A1/A2 | Weight of Carbon Powder 1/(Weight of Carbon Powder 1 and Carbon Powder 2) | 1C Discharge Capacity [mAh/g] |
|---|---|---|---|---|---|---|
| Example B1 | 3 | 2.00 (FX-35) | 14.41 (EC600JD) | 0.14 | 0.5 | 119 |
| Example B2 | 3 | 2.00 (FX-35) | 14.41 (EC600JD) | 0.14 | 0.6 | 125 |
| Example B3 | 3 | 2.00 (FX-35) | 14.41 (EC600JD) | 0.14 | 0.7 | 122 |
| Example B4 | 3 | 2.00 (FX-35) | 14.41 (EC600JD) | 0.14 | 0.8 | 119 |
| Example B5 | 3 | 2.00 (FX-35) | 14.41 (EC600JD) | 0.14 | 0.95 | 99 |
| Example B6 | 3 | 2.00 (FX-35) | 14.41 (EC600JD) | 0.14 | 0.4 | 117 |
| Example B7 | 3 | 2.00 (FX-35) | 14.41 (EC600JD) | 0.14 | 0.3 | 111 |
| Example B8 | 3 | 2.00 (FX-35) | 14.41 (EC600JD) | 0.14 | 0.1 | 103 |
| Example B9 | 3 | 2.19 (DAB) | 14.41 (EC600JD) | 0.15 | 0.6 | 120 |
| Example B10 | 3 | 1.60 (KS-6) | 14.41 (EC600JD) | 0.11 | 0.6 | 107 |
| Example B11 | 3 | 2.00 (FX-35) | 13.89 (3400B) | 0.14 | 0.6 | 112 |
| Example B12 | 3 | 2.00 (FX-35) | 11.19 (SuperP) | 0.18 | 0.6 | 112 |
| Example B13 | 3 | 2.19 (DAB) | 13.89 (3400B) | 0.16 | 0.6 | 120 |
| Example B14 | 5 | 2.00 (FX-35) | 14.41 (EC600JD) | 0.14 | 0.6 | 118 |
| Example B15 | 10 | 2.00 (FX-35) | 14.41 (EC600JD) | 0.14 | 0.6 | 117 |
| Example B16 | 30 | 2.00 (FX-35) | 14.41 (EC600JD) | 0.14 | 0.6 | 111 |
| Example B17 | 45 | 2.00 (FX-35) | 14.41 (EC600JD) | 0.14 | 0.6 | 101 |
| Comparative Example B1 | 60 | 2.19 (DAB) | None | — | 1 | 90 |
| Comparative Example B2 | 3 | 2.19 (DAB) | None | — | 1 | 89 |
| Comparative Example B3 | 3 | 11.19 (SuperP) | 14.41 (EC600JD) | 0.78 | 0.6 | 94 |
| Comparative Example B4 | 3 | 1.60 (KS-6) | 2.19 (DAB) | 0.73 | 0.6 | 97 |

DESCRIPTION OF REFERENCE SIGNS 30 active material
10 positive electrode (electrode)
12 current collector
14 active material layer
100 lithium ion secondary battery

The invention claimed is:

1. An active material comprising:
a LiVOPO$_4$ powder;
a first carbon powder; and
a second carbon powder,
wherein:
a relational expression of 0.05≤A1/A2≤0.5 is satisfied, where A1 represents a ratio of a G band peak height observed around 1580 cm$^{-1}$ in Raman spectrum of the first carbon powder to a 2D band peak height observed around 2700 cm$^{-1}$ in the Raman spectrum of the first carbon powder, and A2 represents a ratio of a G band peak height observed around 1580 cm$^{-1}$ in Raman spectrum of the second carbon powder to a 2D band peak height observed around 2700 cm$^{-1}$ in the Raman spectrum of the second carbon powder;
A1 for the first carbon powder is 2.00, 2.19, or 1.60; and
A2 for the second carbon powder is 13.89 or 14.41.

2. The active material according to claim 1, wherein a relational expression of 0.1≤A1/A2≤0.2 is satisfied.

3. The active material according to claim 2, wherein a relational expression of 0.02≤M1≤0.98 is satisfied, where M1 represents a ratio of weight of the first carbon powder to total weight of the first carbon powder and the second carbon powder.

4. The active material according to claim 1, wherein a relational expression of 0.02≤M1≤0.98 is satisfied, where M1 represents a ratio of weight of the first carbon powder to total weight of the first carbon powder and the second carbon powder.

5. The active material according to claim 1, wherein a relational expression of 0.03≤M2≤0.2 is satisfied, where M2 represents a ratio of weight of the first carbon powder and the second carbon powder to total weight of the LiVOPO$_4$ powder, the first carbon powder, and the second carbon powder.

6. The active material according to claim 1, wherein the LiVOPO$_4$ powder is obtained by hydrothermal synthesis.

7. The active material according to claim 1, wherein the LiVOPO$_4$ powder, the first carbon powder, and the second carbon powder are mixed by a planetary ball mill.

8. An electrode comprising the active material according to claim 1.

9. A lithium ion secondary battery comprising the electrode according to claim 8.

10. The active material according to claim 1, wherein the first carbon powder and the second carbon powder have a mean particle diameter of 20 to 150 nm.

11. The active material according to claim 1, wherein A1 for the first carbon powder is 2.00 or 2.19.

12. A method for manufacturing an active material, comprising:
mixing a $LiVOPO_4$ powder, a first carbon powder, and a second carbon powder,
wherein:
a relational expression of $0.05 \leq A1/A2 \leq 0.5$ is satisfied, where A1 represents a ratio of a G band peak height observed around 1580 $cm^{-1}$ in Raman spectrum of the first carbon powder to a 2D band peak height observed around 2700 $cm^{-1}$ in the Raman spectrum of the first carbon powder, and A2 represents a ratio of a G band peak height observed around 1580 $cm^{-1}$ in Raman spectrum of the second carbon powder to a 2D band peak height observed around 2700 $cm^{-1}$ in the Raman spectrum of the second carbon powder;
A1 for the first carbon powder is 2.00, 2.19, or 1.60; and
A2 for the second carbon powder is 13.89 or 14.41.

13. The method according to claim 12, wherein a relational expression of $0.1 \leq A1/A2 \leq 0.2$ is satisfied.

14. The method according to claim 13, wherein, when a relational expression of A1<A2 is satisfied, a relational expression of $0.02 \leq M1 \leq 0.98$ is satisfied, where M1 represents a ratio of weight of the first carbon powder to total weight of the first carbon powder and the second carbon powder.

15. The method according to claim 12, wherein, when a relational expression of A1<A2 is satisfied, a relational expression of $0.02 \leq M1 \leq 0.98$ is satisfied, where M1 represents a ratio of weight of the first carbon powder to total weight of the first carbon powder and the second carbon powder.

16. The method according to claim 12, wherein a relational expression of $0.03 \leq M2 \leq 0.2$ is satisfied, where M2 represents a ratio of weight of the first carbon powder and the second carbon powder to total weight of the $LiVOPO_4$ powder, the first carbon powder, and the second carbon powder.

17. The method according to claim 12, wherein the $LiVOPO_4$ powder is obtained by hydrothermal synthesis.

18. The method according to claim 12, wherein the mixing is performed by a planetary ball mill.

* * * * *